United States Patent
Inoguchi et al.

(10) Patent No.: US 7,027,229 B2
(45) Date of Patent: Apr. 11, 2006

(54) DISPLAY OPTICAL SYSTEM

(75) Inventors: Kazutaka Inoguchi, Tochigi (JP);
Shoichi Yamazaki, Kanagawa (JP);
Motomi Matsunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/839,039

(22) Filed: May 5, 2004

(65) Prior Publication Data

US 2004/0223122 A1 Nov. 11, 2004

(30) Foreign Application Priority Data

May 8, 2003 (JP) .............................. 2003-130525

(51) Int. Cl.
*G02B 27/14* (2006.01)
*G09G 5/00* (2006.01)
(52) U.S. Cl. ........................... 359/630; 359/631; 345/7
(58) Field of Classification Search ................ 359/630, 359/631, 633, 636–640; 345/7–9
See application file for complete search history.

(56) References Cited

U.S. PATENT DOCUMENTS 4,697,882 A * 10/1987 Sato et al. .................. 359/640
5,734,506 A * 3/1998 Williams .................... 359/633

(Continued)

FOREIGN PATENT DOCUMENTS

| JP | 7-333551 | 12/1995 |
|---|---|---|
| JP | 8-50256 | 2/1996 |
| JP | 8-160340 | 6/1996 |
| JP | 8-179238 | 7/1996 |
| JP | 2000-187177 | 7/2000 |
| JP | 2002-90692 | 3/2002 |

OTHER PUBLICATIONS

English Abstract for Japanese Patent Application Laid-Open No. 7-333551.

(Continued)

*Primary Examiner*—David N. Spector
(74) *Attorney, Agent, or Firm*—Morgan & Finnegan, LLP

(57) ABSTRACT

A display optical system is disclosed which can attain a reduction in size and widening of an angle of view. The display optical system comprises an optical system including a first optical system and a second optical system. The first optical system includes a first surface decentered with respect to a central principal ray, and a second surface which reflects again light reflected on the first surface to the first surface. The first surface reflects the central principal ray incident on the first surface again from the second surface substantially to the opposite side to the previous reflection with respect to a normal on a hit point of the central principal ray. The first optical system directs light to an eye of an observer. The second optical system directs the illumination light to the image forming element and directs the display light to the first optical system.

8 Claims, 5 Drawing Sheets

U.S. PATENT DOCUMENTS

| | | | |
|---|---|---|---|
| 6,023,373 A * | 2/2000 | Inoguchi et al. | 359/633 |
| 6,134,051 A * | 10/2000 | Hayakawa et al. | 359/630 |
| 6,222,676 B1 * | 4/2001 | Togino et al. | 359/630 |
| 6,462,881 B1 * | 10/2002 | Takeyama | 359/630 |
| 6,512,635 B1 * | 1/2003 | Takeyama | 359/638 |
| 6,646,809 B1 * | 11/2003 | Ishino et al. | 359/630 |
| 2002/0034016 A1 * | 3/2002 | Inoguchi et al. | 359/630 |
| 2002/0036831 A1 * | 3/2002 | Inoguchi et al. | 359/630 |
| 2002/0060851 A1 * | 5/2002 | Yamazaki | 359/630 |
| 2003/0107816 A1 * | 6/2003 | Takagi et al. | 359/631 |
| 2003/0197943 A1 * | 10/2003 | Yamazaki et al. | 359/631 |
| 2004/0218243 A1 * | 11/2004 | Yamazaki et al. | 359/212 |

OTHER PUBLICATIONS

English Abstract for Japanese Patent Application Laid-Open No. 8-50256.

English Abstract for Japanese Patent Application Laid-Open No. 8-160340.

English Abstract for Japanese Patent Application Laid-Open No. 8-179238.

English Abstract for Japanese Patent Application Laid-Open No. 2000-187177.

English Abstract for Japanese Patent Application Laid-Open No. 2002-90692.

* cited by examiner

DISPLAY OPTICAL SYSTEM

BACKGROUND OF THE INVENTION

1. Field of the Invention

The present invention relates to a display optical system used in an image display apparatus which is referred to as a head mounted display or a spectacle type display or the like for observing an original image formed on a reflective image forming element.

2. Description of the Related Art

An image display apparatus of a head mounted type (so-called a head mounted display) has conventionally been known in which an image forming element such as an LCD (Liquid Crystal Display) is used to enlargingly display an original image displayed on the image forming element through an optical system.

Since the head mounted display is mounted on the head of an observer, reduction in size and weight of the entire apparatus are particularly needed. Furthermore, the head mounted display is required to have small thickness in the visual axial direction of the observer in consideration of weight balance, appearance and the like. In addition, it is desirable to provide the largest possible enlarged image to produce a dynamic effect in the displayed image.

For example, in the patent documents 1 through 4 which are described below, there are proposed head mounted displays which use a transmission type image forming element and an optical element (so-called a free curve surface prism) having an incident surface, a plurality of reflective surfaces and an emergent surface including a rotationally asymmetric surface on surfaces of a transparent body to achieve a reduction in thickness of the entire apparatus.

On the other hand, advancement has been made in the refining of the image forming element such as the LCD or the like, so that an image forming element has been developed which has the same number of pixels as the conventional element while being reduced in size than the conventional element. As such image forming element which has been reduced in size and has been refined, a reflective image display element is regarded as being promising.

However, it is required to increase the magnification power of the display optical system in order to achieve the observation angle of view which is the same as the conventional one while using such size reduced image forming element. When the magnification power is increased, the display optical system can be easily increased in size.

Furthermore, when the reflective image forming element is used, it is required to provide an illumination system for allowing illumination light to be incident thereon from the side of the display surface. Consequently, the entire apparatus can be easily increased in size.

As an image display apparatus which deals with these problems, apparatuses have been proposed in the patent documents 5 and 6 which are described below.

The image display apparatus proposed in the patent document 5 has two free curve surface prisms. In the apparatus, the angle of view is widened with respect to the panel size by using one of the free curve surface prisms as a relay optical system, forming an intermediate image once and then guiding the intermediate image to the observer by using the other free curve prism as an eyepiece optical system.

Furthermore, in an the above apparatus, an optical path which is crossed in a shape of a numeric character four is formed in one of the free curve prism to reduce the size of the optical system with respect to the optical path length. Furthermore, an attempt is made to further reduce in size by using the prism as an illumination optical system in addition to using as the relay optical system as described above.

Furthermore, the image display apparatus proposed in the patent document 6 has a display optical system having three free curve prisms. In the apparatus, after an intermediate image is formed once with two free curve surface prisms which serve as a relay optical system, the intermediate image is guided to an eye of an observer by using the remaining free curve surface prism as an eyepiece optical system. As a consequence, the angle of view is widened with respect to the image forming element. Furthermore, an illumination optical system is inserted which does not contribute to the image formation between the three free curve surface prisms and the image forming element.

[Patent Document 1]
 Japanese Patent Application Laid-Open No. H7(1995)-333551

[Patent Document 2]
 Japanese Patent Application Laid-Open No. H8(1996)-50256

[Patent Document 3]
 Japanese Patent Application Laid-Open No. H8(1996)-160340

[Patent Document 4]
 Japanese Patent Application Laid-Open No. H8(1996)-179238

[Patent Document 5]
 Japanese Patent Application Laid-Open No. 2000-187177 (corresponding to U.S. Pat. No. 6,222,676)

[Patent Document 6]
 Japanese Patent Application Laid-Open No. 2002-90692

However, in the image display apparatus which is proposed in the aforementioned patent document 5, there is a problem in that a flexibility of the design of the illumination optical system or the display optical system is lacking and the size of the light source is easily enlarged because only one of the free curve surface prisms is used as an illumination optical system.

Furthermore, in order to reduce the size of the display optical system with respect to the optical path length, the optical path in a shape of a numeric character four is formed in one of the free curve prisms. Consequently, the structure of the prism is limited.

In addition, it has been described that after the illumination light is allowed to be incident on and transmitted through one of the optical surfaces of the prism, the display light (the light which is modulated with the image forming element) which is sent back to the surface is subjected to a total reflection, and the incident area for the illumination light and the reflection area for the display light are divided on the optical surface. However, since it is required to form the optical path formed in a shape of a numeric character four is formed in the prism including the incident surface for the illumination light, it is extremely difficult to achieve the aforementioned items by using a small size prism.

In addition, in the image display apparatus proposed in the patent document 6, the illumination optical system is inserted which does not contribute to the image formation between the three curve surface prisms and the image forming element. As a consequence, the restraint condition of the design of the display optical system is increased so that it becomes difficult to realize the larger angle of view and reduction in size.

SUMMARY OF THE INVENTION

An object of the present invention is to provide a display optical system which enables both a reduction in size and a larger angle of view.

The display optical system according to one aspect of the present invention to achieve the aforementioned object comprises a light source, a reflective image forming element which forms an original image and receives illumination light from the light source and an optical system which guides display light from the image forming element to an eye of an observer. Here, the optical system includes a first optical system and a second optical system. The first optical system includes a first surface which has at least a reflection action and which is decentered with respect to a central principal ray and a second surface which reflects again the central principal ray reflected on the first surface toward the first surface. The first surface reflects the central principal ray which is again incident on the first surface from the second surface substantially to an opposite side to the previous reflection with respect to a normal on a hit point of the central principal ray on the first surface. Furthermore, at least one surface of the second optical system has a curve surface which is decentered with respect to the central principal ray. The first optical system directs the display light to the eye of the observer, and the second optical system directs the illumination light to the image forming element and directs the display light to the first optical system.

Furthermore, the display optical system according to another aspect of the present invention comprises a light source, a reflective image forming element which forms an original image and receives illumination light from the light source, and an optical system which guides display light from the image forming element to an eye of an observer. Here, the optical system includes a first optical system and a second optical system. The first optical system has a reflective surface which is decentered with respect to the optical path. There is included a case in which light is reflected on the reflective surface a plurality of times while an inner product between outer products each formed by vectors of incident light and reflected light in the respective reflections preformed the plurality of times is negative. At least one surface of the second optical system has a curve surface which is decentered with respect to the optical path. The first optical system directs the display light to the eye of the observer. The second optical system directs the illumination light to the image forming element and directs the display light to the first optical system.

The characteristic of the display optical system according to the present invention will be made clear from the explanation on specific embodiments shown hereinbelow by referring to the drawings.

DETAILED DESCRIPTION OF THE PREFERRED EMBODIMENTS

Figure 1:
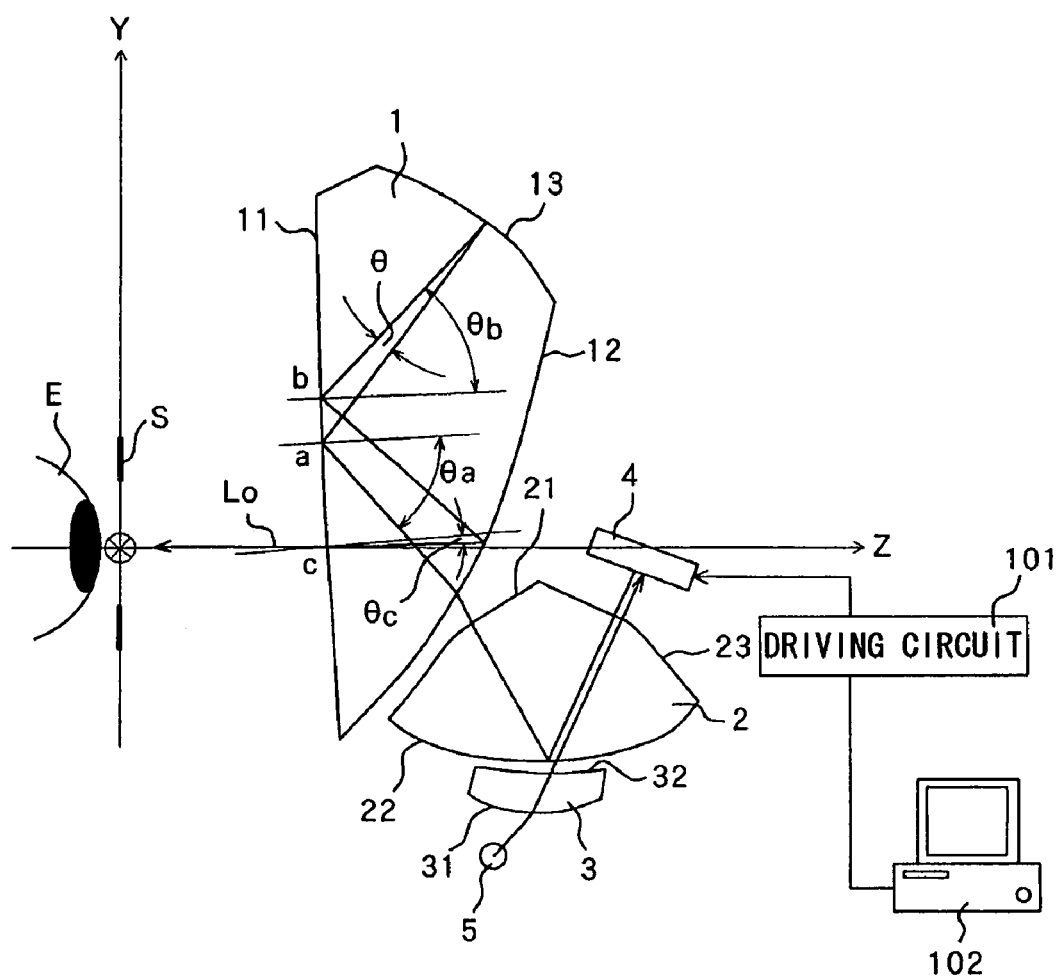
FIG. 1 is a sectional view of a display optical system (and an image display apparatus) according to Embodiment 1 of the present invention.

Hereinafter, embodiments of the present invention will be explained by referring to the drawings.

(Embodiment 1)

Figure 2:
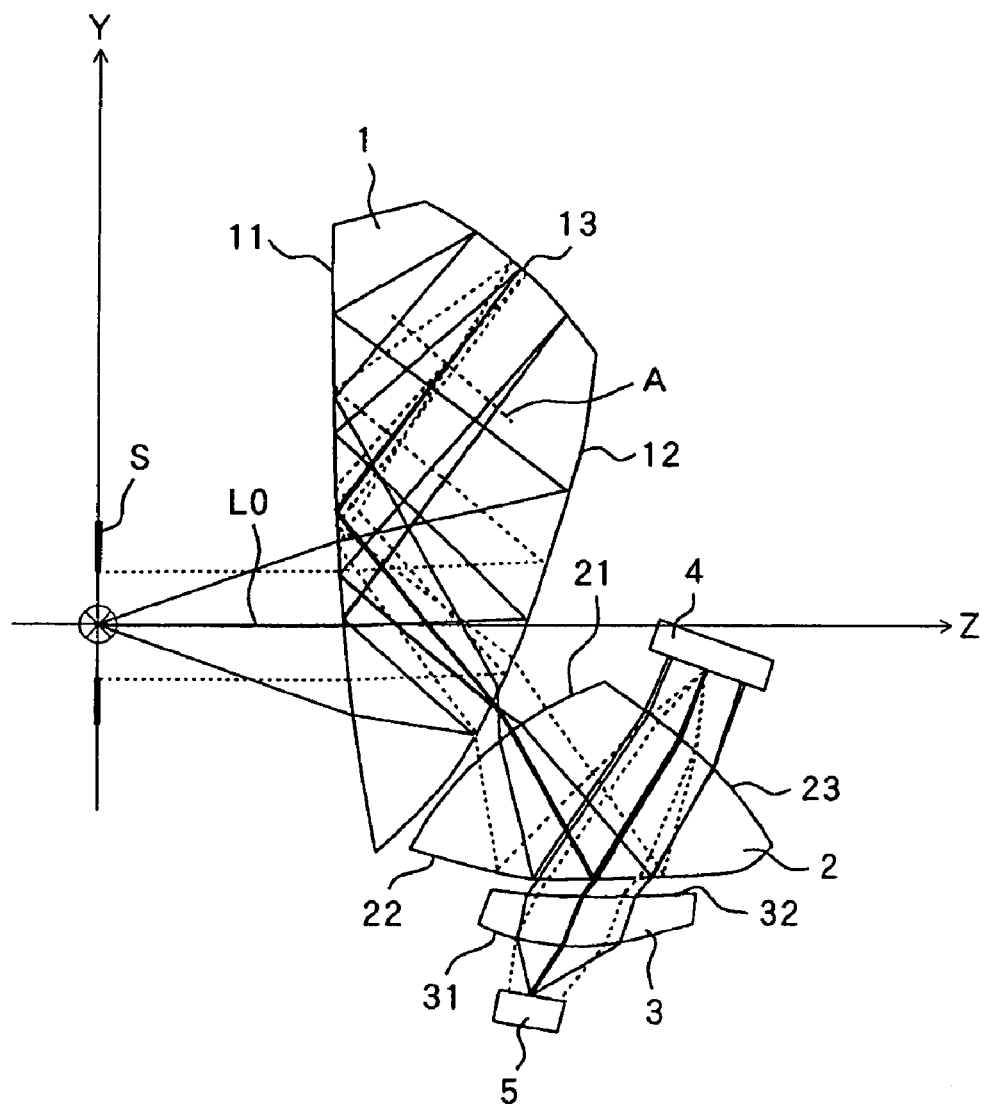
FIG. 2 is an optical path view of a display optical system according to Embodiment 1 of the present invention.

FIGS. 1 and 2 are respectively a sectional view and an optical path view for explaining an image display apparatus having a display optical system according to Embodiment 1 of the present invention. The image display apparatus according to Embodiment 1 is a head mounted type image display apparatus which is referred to as a head mounted display or the like.

In FIGS. 1 and 2, reference numeral 1 denotes a first optical element constituting a first optical system, reference numeral 2 denotes a second optical element constituting a second optical system, and reference numeral 3 denotes a third optical element constituting a third optical system.

The first optical element 1 is a prism-shaped optical element having three optical surfaces 11, 12 and 13 on a transparent medium which has a refractive index of 1 or more. The second optical element 2 is a prism-shaped optical element having three optical surfaces 21, 22 and 23 on a transparent medium which has a refractive index of 1 or more. The third optical element 3 is a lens-shaped optical element having two optical surfaces 31 and 32 on a transparent medium which has a refractive index of 1 or more.

The first and second optical elements 1 and 2 constitute an optical system for forming an optical path of display light from a reflective liquid crystal display (LCD: a reflective image forming element) 4 to an eye E of an observer while the second and the third optical elements 2 and 3 constitute an optical system for forming an optical path of illumination light from a light source 5 to the reflective LCD 4.

Symbol S denotes an exit pupil of the optical system for the display light, which is formed with the first and second optical elements 1 and 2. Symbol L0 denotes a central principal ray which emerges from the center of the display surface of the reflective LCD 4 and reaches the center of the pupil S. In Embodiment 1, the central principal ray is treated as a ray on a reference axis which corresponds to the optical axis of the display optical system. Incidentally, FIG. 1 is a sectional view on a plane including the central principal ray L0 which is incident on a reflective surface decentered with respect to the central principal ray L0 or the optical path to be reflected on the reflective surface.

Here, coordinates are defined as global coordinates in which a Z-axis is taken in an opposite direction (the visual axis direction of the observer) with respect to the incident direction of the central principal ray L0 to the center of the pupil S by setting the center of the pupil S as an original point, a Y-axis is taken in a direction perpendicular to the Z-axis direction on the cross section of the drawing, and an X-axis is taken in a direction perpendicular to the cross section thereof.

FIG. 2 is also an optical path view on a cross section including the central principal ray L0 in the same manner as FIG. 1, in which the central principal ray L0 is shown with a thick line, and maximum field-angle principal rays on the Y-Z cross section are shown with solid lines which reach the center of the exit pupil S from both ends of the effective display area on the Y-Z cross section of the reflective LCD 4, and central field-angle marginal rays are shown with dot lines which reach both ends of the Y-Z cross section of the exit pupil S from the center of the display surface of the reflective LCD 4.

First, the optical path and the optical action in Embodiment 1 will be briefly explained. Light (illumination light) from the light source 5 is transmitted through the surfaces 31 and 32 of the third optical element 3 constituting the optical system for the illumination light, and then, the illumination light is transmitted through the surfaces 22 and 23 of the second optical element 2 constituting the optical systems for the display light and the illumination light to illuminate the reflective LCD 4.

As shown in FIG. 1, a driving circuit 101 for driving the reflective LCD 4 is electrically connected to the reflective LCD 4. Furthermore, to the driving circuit 101, an image information supply apparatus 102 such as a personal computer, a DVD player, a video recorder, a television set or the like is electrically connected. The driving circuit 101 drives the reflective LCD 4 in accordance with the image information input from the image information supply apparatus 102 to form an original image thereon. The image display apparatus and the image information supply apparatus constitute an image display system.

Light (display light) which is modulated in accordance with the original image on the reflective LCD 4 and reflected by it is incident again into the second optical element 2 from the surface 23 and is reflected on the surface 22, so that the display light is emerged out of the second optical element 2 from the surface 21 to be directed to the first optical element 1.

In the first optical element 1, the display light is incident into the first optical element 1 from the surface 12 and is reflected on the surface 11, the surface 13, the surface 11 and the surface 12 in this order, and the display light is emerged out of the first optical element 1 from the surface 11 to reach the exit pupil S.

The observer who places an eye E in the vicinity of the exit pupil S can observe an enlarged image of the original image formed on the reflective LCD 4 with the optical actions which the display light receives from the curve surfaces of the first optical element 1 and the second optical element 2 during tracing the abovedescribed optical path.

Next, the structure of the first optical element 1 and the display optical path in the first optical element 1 will be described in detail. The surface 12 of the first optical element 1 is a half-mirror surface provided with a coating of a half transmissive reflective film of, for example, a metal or a dielectric body.

The surface 12 is a transmissive/reflective surface which functions as an incident surface for the display light and a final reflective surface for the display light, that is, which has both actions of transmission and reflection. In addition, the surface 11 is a half-mirror surface provided with a coating of, for example, a half transmissive film. The surface 11 is a reflective surface which reflects the display light incident from the surface 12 to be guided to the surface 13 and again reflects the display light reflected on the surface 13 back to the surface 12. The surface 11 is also an emergent surface which allows the display light to emerge from the first optical element 1. Consequently, the surface 11 is a surface which has both actions of a transmission and two reflections.

Furthermore, the surface 13 is a reflective surface provided with a reflective film of, for example, a metal film such as aluminum or silver, or a dielectric body. The surface 13 reflects the display light reflected on the reflective surface 11 again back to the reflective surface 11.

The optical path in the first optical element 1 will be described in detail by using the central principal ray L0. The central principal ray L0 which is incident into the first optical element 1 from the surface 12 is directed to the surface 11 in such a manner that the progress direction of the central principal ray L0 in the projection toward the Y-axis becomes positive. Then, the central principal ray L0 is incident on a point (hit point) a on the surface 11 at an angle of θa and is reflected on the surface 11 to be guided to the surface 13 while keeping the state in which the progress direction of the projection toward the Y-axis becomes positive.

The surface 13 reflects the central principal ray L0 so that the ray L0 goes back in a substantially opposite direction on the optical path on which the central principal ray L0 has traced toward the surface 13. In Embodiment 1, the central principal ray L0 which has traveled so that the progress direction of the Y-axis projection up to the surface 13 becomes positive is reflected so that the central principal ray L0 travels in the opposite direction, that is, the progress direction of the Y-axis projection becomes negative. Thus, the central principal ray L0 is reflected so that an angle θ formed with the incident light and the reflected light on the surface 13 comes to be set to a value smaller than the predetermined angle. Therefore, the optical path from the surface 11→the surface 13→the surface 11 can be approximately overlapped by reversing the progress direction of the central principal ray L0 in the Y-axis projection and allowing the ray L0 to be incident again on a point "b" in the vicinity of the hit point "a" which is the first reflection point on the surface 11.

The central principal ray L0 which is reflected on the surface 13 is incident again on the point b on the surface 11 at an angle θb to be reflected while keeping the state in which the progress direction in the Y-axis projection is negative. That is, the central principal ray L0 is reflected to the substantially opposite side to the previous reflection with respect to the normal on the hit point of the central principal ray L0 on the surface 11.

In Embodiment 1, a Y-axis projection is taken as an example for explaining the action of an returning reflection on an returning reflective surface 13. It has been explained that the progress directions of the ray in the Y-axis projection become opposite before and after the reflection on the surface 13. However, it is not always required the returning reflection that the projection which is changed in the progress direction between positive and negative is Y-axis projection, and the projection can be appropriately selected. That is, the direction of an incident ray on the surface 11 with respect to the surface normal of the first reflection position "a" is necessary to locate opposite to the direction of an incident light on the surface 11 with respect to the surface normal of the second reflection position "b". For example, when the directions of θa and θb in FIG. 1 are represented in such a manner that the directions of the incident rays on the hit points as seen from the normal on the respective hit points "a" and b are represented with a clockwise direction defined as positive, θa is set to be negative and θb is set to be positive.

The central principal ray L0 which is reflected in the second reflection on the surface 11 travels again toward the surface 12 and reaches the vicinity of the incident position thereof into the first optical element 1 in the surface 12. Consequently, in Embodiment 1, a to-and-fro optical path of the surface 12→the surface 11→the surface 13→the surface 11 and→the surface 12 is formed which comprises a forward path of the surface 12→the surface 11→the surface 13 and the return path of tracing the surface 13→the surface 11→the surface 12. Thus, the forward path and the return path are substantially overlapped. The central principal ray L0 is further reflected on the surface 12 to be incident on a point c on the surface 11 at an angle θc to allow the first optical element 1 to emerge to travel toward the pupil S.

In the aforementioned structure, the reflection on the surface 13 for reflecting again the light which is reflected on the surface 11 (decentered reflective surface) so that the light returns back in an opposite direction to the surface 11 is referred to as a returning reflection and the surface 13 is referred to as a returning reflective surface. It becomes possible to reduce the size of the optical system with respect to the optical path length by arranging the returning reflective surface in the first optical element 1 to allow the returning reflection of the display light and forming a to-and-fro optical path being a substantially overlapped optical path in the first optical element 1.

Furthermore, the optical path of the surface 12→the surface 11→the surface 13 is folded in the forward path with the surface 11 serving as a reflective surface which is decentered with respect to the central principal ray L0. At the same time, the thickness of the first optical element 1 in the direction of the Z-axis is suppressed by folding the optical path of the surface 13→the surface 11→the surface 12→the surface 12 in the return path with the two surfaces 11 and 12 each acts as a reflective surface decentered with respect to the central principal ray L0, so that the first optical element 1 is formed as a thin optical element.

Here, when the reflective surface before and after the returning reflective surface (surface 13), for example, the reflection on the surface 11 is noted, the directions of outer products each formed by a vector showing the incident direction onto the surface 11 and a vector showing the reflection direction therefrom in the forward path and the return path become approximately opposite. In Embodiment 1, only the surface 11 functions as a reflective surface in the forward path and the return path, it is possible however to form an optical path by providing a plurality of similar surfaces.

It is possible to contain a long optical path in a narrow space while suppressing the occurrence of distortion by using the reflection on the returning reflective surface which is thus characterized, in comparison with so-called zigzag reflections performed between two ordinary surfaces facing each other. Furthermore, in Embodiment 1, there is shown a case in which the reflection on the surface 11 is performed twice, but the display optical system according to the present invention is not limited thereto. The light may be reflected three times or more on a specific reflective surface with a plurality of times of the returning reflection so that the optical power of the reflective surface can be used.

Furthermore, in Embodiment 1, it is preferable that the returning reflective surface has a plane symmetrical shape in which the cross sectional plane (paper plane in FIG. 1) is the only symmetrical plane. The cross sectional plane includes the incident light and the reflected light (central principal ray L0) on the returning reflective surface (surface 13). Thereby, a symmetrical surface which provides a reference for each of the surfaces exists so that the assembling and adjustment of the system becomes easy. However, it is not required that the incident light and the reflected light exist on the paper plane of FIG. 1. That is, the component in a direction perpendicular to the paper plane of FIG. 1 may be given to the light which is reflected on the returning reflective surface by the returning reflective surface.

In this case, for example, the surface 11 is noted which reflects the central principal ray L0 toward the returning reflective surface and which allows the central principal ray L0 reflected on the returning reflective surface to be incident thereon, the directions of the outer products each formed by the vector showing the incident direction onto the surface 11 and the vector showing the reflection direction therefrom in the forward path and the return path form an obtuse angle. Furthermore, the structure of the optical path can be characterized by the fact that an inner product formed between the abovedescribed outer products becomes negative.

Furthermore, a component in a direction perpendicular to the paper plane in FIG. 1 may be given to light which is reflected on the other reflective surfaces in addition to the returning reflective surface.

Thereby, each of the reflective surfaces has a decentration in a direction perpendicular to the paper plane in FIG. 1 with respect to the central principal ray L0, so that the flexibility of the optical design can be increased.

Next, in Embodiment 1, there will be described preferable conditions for the returning reflection with the aforementioned surface 13.

It is preferable that the range of the angle θ formed with the incidence and reflection of the central principal ray L0 with respect to the surface 13 which is the returning reflective surface is set to $$|\theta|<45°. \quad (1)$$

If the angle θ exceeds the upper limit of the condition, the arrangement of each surface is extremely limited in order to form the to-and-fro optical path with the returning reflection, which means that such angle is not preferable. On the other hand, when the structure is provided so as to satisfy the conditional expression (1), a to-and-fro optical path is formed with the returning reflection irrespective of the arrangement and structure of the other surfaces, it becomes relatively easy to reduce the size of the optical system with respect to the optical path length.

Further preferably, the range of θ may be set to $$|\theta|30°. \quad (2)$$

If the angle θ satisfies the condition, the overlapping degree of the areas which are used in the two reflections on the surface 11 as well as the reflection and transmission on the surface 12 is heightened, so that the optical system can be further reduced in size.

Furthermore, in Embodiment 1, at least one surface of the surfaces 11, 12 and 13 of the first optical element 1 is formed as a curve surface, so that it is necessary to allow the surface to have an optical power (a reciprocal of a focal length). As a consequence, at least one surface of the surfaces 11, 12 and 13 can contribute to an image-formation action at the time of guiding an enlarged image of the original image formed on the reflective LCD 4 to the pupil S.

Preferably, all the surfaces 11, 12 and 13 have optical powers. As a consequence, the surface which does not contribute to the image formation can be eliminated, so that an attempt can be made to decrease the number of optical surfaces to be used and to reduce the cost while keeping the flexibility of the aberration correction on a high level.

Furthermore, it is required that at least the surfaces 11 and 12 become reflective surfaces which are decentered with respect to the central principal ray L0. However, when the optical powers are provided to these decentered reflective surfaces, decentration aberration is occurred. In order to correct the decentration aberration, it is required to form the surfaces 11 and 12 in a rotationally asymmetric shape instead of an ordinary rotationally symmetric shape. In the structure according to Embodiment 1, since the decentration is relatively large at the time of reflection on the surface 12, and since the surface 12 has a strong optical power with respect to the surface 11, the occurrence of the decentration aberration on the surface 12 becomes remarkable. Consequently, it is preferable to correct the decentration aberration which is occurred on the surface 12 by forming the surface 12 in a rotationally asymmetric surface.

Further preferably, all the surfaces 11, 12 and 13 of the first optical element are formed in a rotationally asymmetric surface, so that an aberration correction performance is increased and a high optical performance can be obtained.

Furthermore, in Embodiment 1, it has been explained that the surface 11 of the first optical element 1 is a half-mirror surface on which a half transmissive reflective film of metal or a dielectric body is formed. The reflection of a luminous flux on the surface 11 may be an internal total reflection. When the central principal ray L0 in the reflection on the surface 11 is taken as an example, the central principal ray L0 is subjected to the internal total reflection by setting θa and θb to be angles exceeding a critical angle of the boundary surface (surface 11) between the medium of the first optical element 1 and the outside medium (air), and the central principal ray L0 is transmitted through the surface 11 by setting θc to an angle smaller than the critical angle. When the structure is provided such that this is also satisfied in all the effective rays except for the central principal ray L0, it is not necessary to provide the half-transmissive reflective film. Consequently, an attempt can be made to reduce the cost and the loss of the light amount is extremely reduced on the surface, so that the usability of light is largely improved.

Furthermore, it may be constituted such that the reflecting luminous flux is subjected to an internal total reflection in a shared area on the surface 11 for the transmitting luminous flux and the reflecting luminous flux. In this case, it becomes necessary to provide an ordinary reflective film (an amount of transmitting light becomes substantially 0) of a metal or a dielectric body on an area which is used only for the reflecting luminous flux. However, as compared with the case in which all the reflecting luminous flux is subjected to an internal total reflection, the usability of light is virtually not lowered. Furthermore, the incident angle condition for rays which is a restraint condition is removed for part of the luminous flux, so that the flexibility in the design is increased, and an attempt can be more easily made to increase the optical performance.

In the case where a reflection with the reflective film and an internal total reflection are both performed in this manner, it is preferable to use a gradation reflective film whose reflectance becomes lower as the position comes close to the internal total reflection area from the reflection area with the reflective film since a boundary due to a change in reflectance between the refection area with the reflective film and the internal total reflection becomes obscure at the time of observation.

Incidentally, the first optical element 1 is not limited to the structure which has been explained above. It is possible to change the overlapping degree of the optical path by changing the structure. As a consequence, since the length of the remaining optical path can be controlled, the selection range of the structure of the second optical element 2 can be widened. Consequently, since a combination of the first optical element and the second optical element can be selected from a plurality of combinations and the flexibility for meeting the required specification is enriched, a high optical performance can be realized.

Next, the second optical element 2 will be explained in detail. In Embodiment 1, the second optical element 2 has a surface 23 which serves as an emergent surface for the illumination light and an incident surface for the display light, a surface 22 which serves as an incident surface for the illumination light and a reflective surface for the display light and a surface 21 which serves as an emergent surface for the display light.

The surface 22 is constituted as a half-mirror surface by forming a half transmissive film of, for example, a metal or a dielectric body thereon.

A display optical path will be explained by using the central principal ray L0. The central principal ray L0 which is emerged from the center of the efficient display area of the display surface of the reflective LCD 4 is incident into the second optical element 2 from the surface 23, and is reflected on the surface 22 which is a reflective surface decentered with respect to the central principal ray L0. The central principal ray L0 then emerges from the surface 21 and is guided to the incident position thereof in the first optical element 1.

In Embodiment 1, it is required that the second optical element 2 also has a curve surface which is decentered with respect to the central principal ray L0. Consequently, it is possible to provide a small-size optical element while effectively using the second optical element 2 for an image formation action. In the second optical element 2 according to Embodiment 1, at least the surface 22 is a reflective surface of the curve surface which is decentered with respect to the central principal ray L0.

It becomes possible to reduce the size of the second optical element 2 and to reduce the size of the whole display optical system because the flexibilities in selection of the direction of guiding an effective luminous flux and in the surface arrangement are heightened by using the decentered reflective surface in this manner. Naturally, the structure may be such that the surface 21 and the surface 23 are decentered with respect to the central principal ray L0 and the arrangement flexibility of the surfaces may further be heightened.

However, it is preferable to suppress the occurrence of the decentration aberration to heighten the optical performance by forming the decentered curve surface as a rotationally asymmetric surface because the decentration aberration is occurred when the decentered curve surface is used. Further preferably, when all the surfaces of the second optical element 2 are formed as rotationally asymmetric surfaces, it becomes possible to correct the decentration aberration with the whole optical system for the display light including the residual decentration aberration which was not corrected by the decentered curve surface of the first optical element 1, so that a display optical system having a very high optical performance can be provided.

Incidentally, it is preferable that the optical system for the display light which comprises the first optical element 1 and the second optical element 2 is a once-image-forming optical system which forms an intermediate image of the original image formed by the reflective LCD 4 once inside the system, enlarges the intermediate image and guides the enlarged intermediate image to the pupil S. In FIG. 2, it is constituted that an intermediate image is formed in the vicinity of the position shown with a dot line A inside of the first optical element 1.

With such a structure, the flexibility of the image formation magnification powers of the first and the second optical elements 1 and 2 as a relay optical system is increased, and the restraint condition of the position of the reflective LCD 4 with respect to the first and the second optical element 1 and 2 as an eyepiece optical system can be eliminated. As a consequence, it becomes possible to widen the angle of view with respect to the size of the reflective LCD 4.

Furthermore, in the case where a rotationally asymmetric surface is used in the optical system for the display light, it is preferable that the surface is formed into a rotationally asymmetric surface with a surface shape having the YZ cross section as its only symmetric plane. It is possible to provide a reference for assembling by keeping the symmetry, and it is also possible to increase the assembling precision and reduce the cost through the reduction of the number of adjustment processes.

Next, the illumination optical path at the second optical element 2 will be explained. A part of light emitted from the light source 5 and then transmitted through the third optical element 3 is incident into the second optical element 2 from the surface 22 which is a half-mirror surface, and then emerges from the transmissive surface 23 of the second optical element 2 to illuminate the reflective LCD 4.

The surfaces 22 and 23 which are also used for the illumination optical path are preferably constituted such that the part which is used as an illumination optical path has a positive optical power as a whole. With such a structure in this manner, the optical power of the third optical element 3 which is used only as an optical system for illumination light can be weakened, so that the third optical element 3 can be relatively small in size.

Next, the third optical element 3 will be explained. The third optical element 3 has a condensing action for the light from the light source 5 to guide the condensed light to the second optical element 2. When the third optical element 3 having a condensing action is provided in this manner, a distance from the light source 5 up to the reflective LCD 4 is shortened, the size of the light-emitting surface of the light source 5 is reduced and the aberration correction performance for the display light can be improved by allowing the third optical element 3 to share part of the optical power which the second optical element 2 should have as the optical system for the illumination light in comparison with a structure in which the illumination light is guided only with the second optical element 2.

Furthermore, when the rotationally asymmetric surface is used in at least one of the surfaces 31 and 32 of the third optical element 3, the asymmetry of the second optical element 2 can be compensated, so that the size of the light-emitting surface of the light source 5 can be extremely reduced.

As has been explained above, in Embodiment 1, the overlapping degree of the optical path is heightened by forming a to-and-fro optical path in which a returning reflection is used in the first optical element 1 that is used only as the optical system for the display light, and the size of the optical system can be extremely reduced with respect to the optical path length. Consequently, it is possible, by appropriately changing the overlapping degree of the optical path in the first optical element 1, to appropriately change the optical path length as which the second optical element 2 should serve in the optical path length of the optical system for the display light. As a consequence, the flexibility in the selection of the type of the second optical element 2 is heightened, and the number of times of reflection in the second optical element 2 and the shape of the second optical element 2 can be appropriately selected in accordance with the specification, and the optical performance can be heightened.

Furthermore, in Embodiment 1, the whole display optical system is formed in a compact size by commonly using the second optical element 2 in the optical system for the display light and in the optical system for the illumination light. Furthermore, by providing the third optical element 3 which is used only in the optical system for the illumination light, it is possible to heighten the conjugate relation between the light source 5 and the exit pupil S of the optical system, and to heighten the usability of light.

(Embodiment 2)

Figure 3:
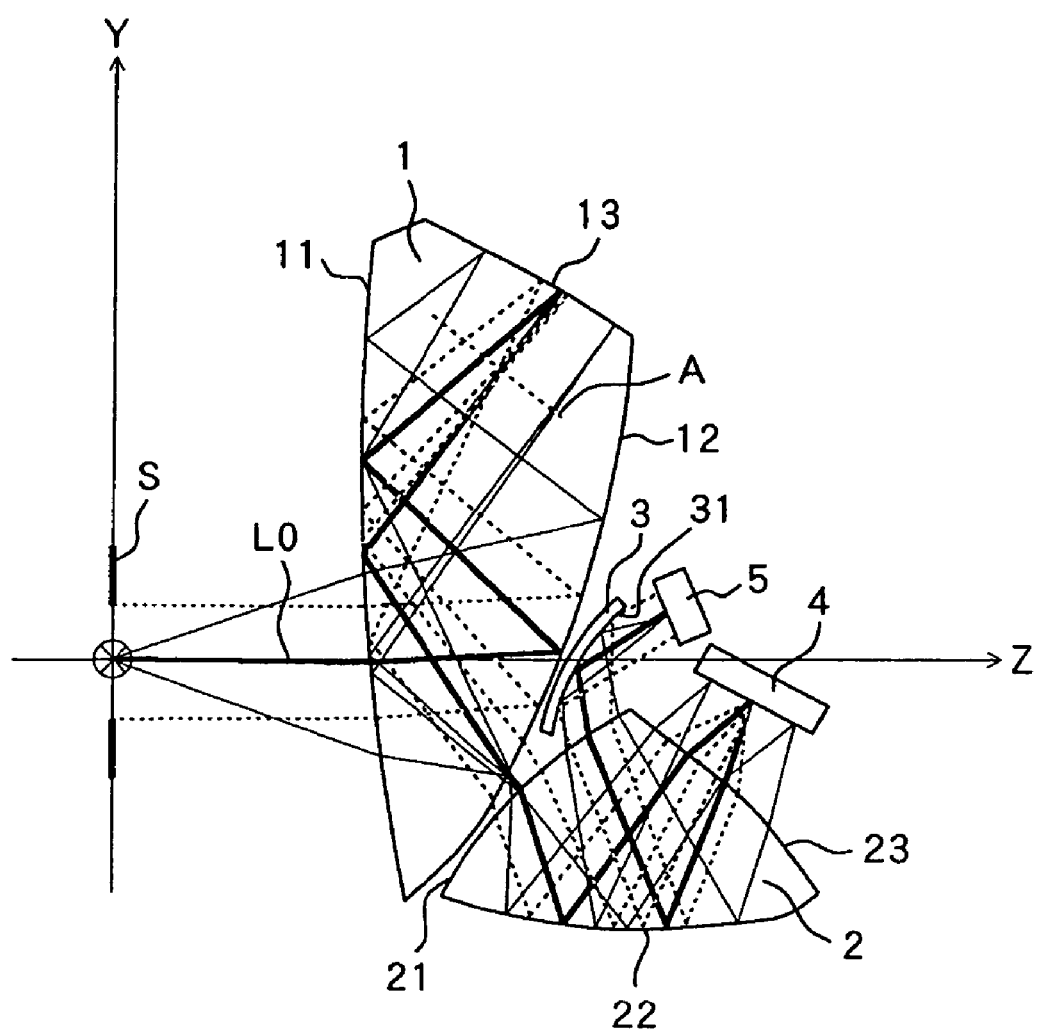
FIG. 3 is an optical path view of the display optical system according to Embodiment 2 of the present invention.

FIG. 3 is an optical path view of a display optical system according to Embodiment 2 of the present invention. In Embodiment 1, the third optical element 3 which is used in the optical system for the illumination light is formed as a lens-shaped optical element having two optical surfaces 31 and 32. In Embodiment 2, a third optical element 3 is formed in a mirror-shaped optical element having only one optical surface (reflective surface) 31, and an incident surface for the illumination light is formed in a second optical element 2 as a surface 21. A surface 22 is formed as a reflective surface without a transmissive action. The other structure is the same as Embodiment 1, and the common constituent elements are denoted by the same reference numerals or symbols.

First, the optical path and the optical action in Embodiment 2 will be briefly explained. Light (illumination light) from the light source 5 is reflected on the reflective surface 31 of the third optical element 3 which constitutes the optical system for the illumination light, is incident into the second optical element 2 from the surface 21, then is reflected on the surface 22 and emerges out of the second optical element 2 from a surface 23 to illuminate the reflective LCD 4 from an oblique direction.

Light (display light) which is modulated and reflected by the reflective LCD 4 is again incident into the second optical element 2 from the surface 23, is then reflected on the surface 22 and emerges from a transmission area different from an incident area (transmission area) for the illumination light in the surface 21 to travel toward the first optical element 1. Furthermore, the display light is incident on the first optical element 1 from a surface 12, is then reflected on a surface 11, a surface 13, a surface 11 and the surface 12 in this order, and emerges out of the first optical element 1 from the surface 11 to reach an exit pupil S.

An observer who places an eye E in the vicinity of the exit pupil S can observe an enlarged image of the original image formed on the reflective LCD 4 with optical actions which the display light receives with the curve surfaces of the first optical element 1 and the second optical element 2 during tracing abovedescribed optical path.

The details of the illumination light optical path formed with the third optical element 3 and the second optical element 2 and the display light optical path formed with the second optical element 2 and the first optical element 1 are the same as the Embodiment 1 except for the content that has been described above.

According to Embodiment 2, a display optical system smaller in size than Embodiment 1 is realized by forming the third optical element 3 as a mirror-shaped optical element and arranging the light source 5 and the third optical element 3 in a space, which is a dead space in Embodiment 1, among the first optical element 1, the second optical element 2 and the reflective LCD 4. Furthermore, the incident surface for the illumination light to the second optical element 2 is formed as a transmissive surface 21 and the illumination light is allowed to be incident on the reflective LCD 4 from the oblique direction (in consequence, the display light which emerges from the reflective LCD 4 progresses in an oblique direction with respect to the reflective LCD 4) to provide the transmission areas used by the illumination light and the display light as different areas in the surface 21. As a result, the surface 22 can be used as a reflective surface which does not virtually generate a transmitting luminous flux as compared with a case in which the surface 22 is used as a half-mirror surface which generates a relatively large amount of transmitting luminous flux as seen in Embodiment 1. Consequently, the loss of the light amount is largely decreased, so that an optical system having a high usability of light can be realized.

(Embodiment 3)

Figure 4:
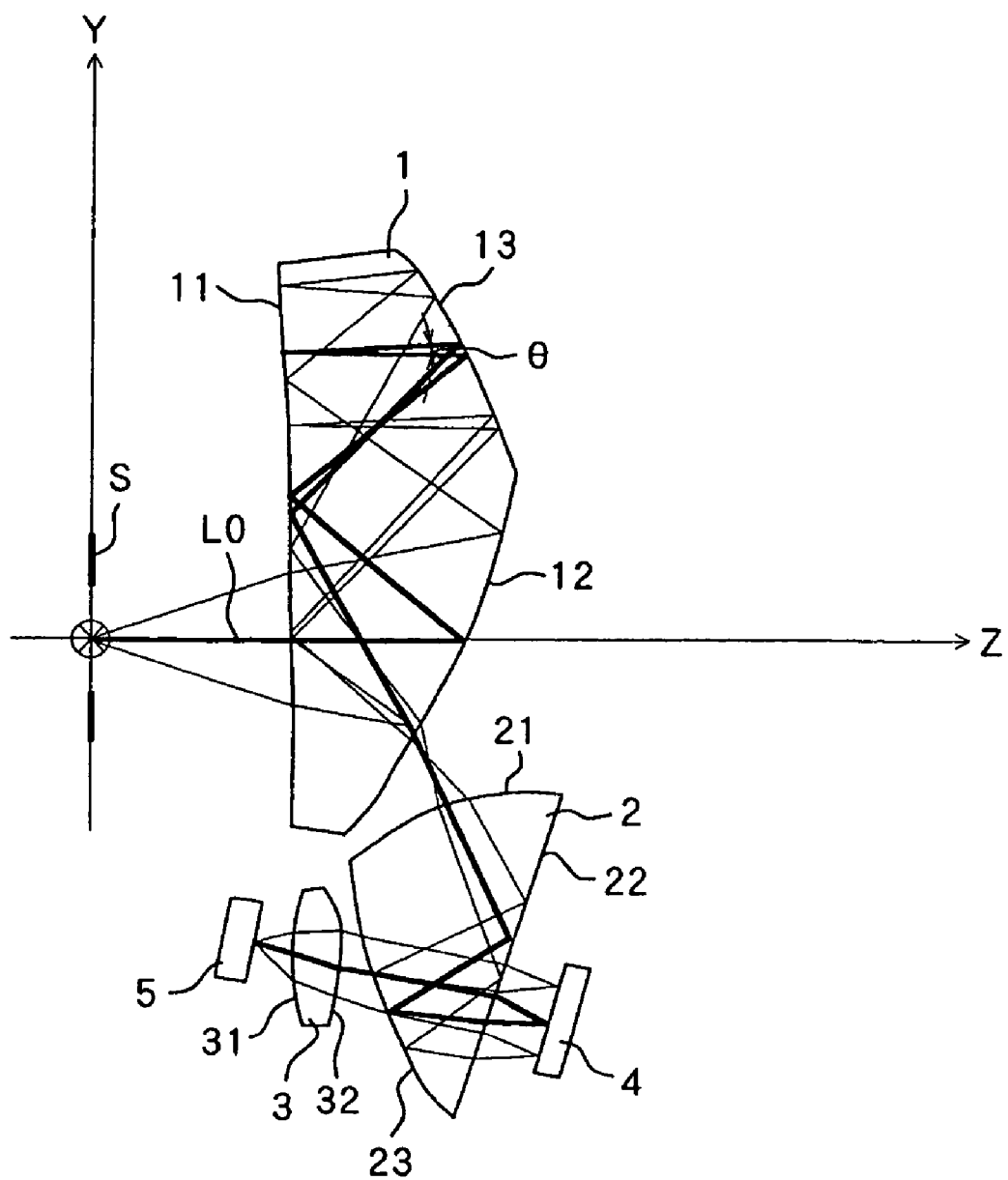
FIG. 4 is a optical path view of the display optical system according to Embodiment 3 of the present invention.

FIG. 4 is an optical path view of a display optical system according to Embodiment 3 of the present invention. In Embodiment 3, an optical path in a first optical element 1 and a second optical element 2 which is used in the optical system for display light is different from Embodiment 1 and illumination light optical path in the second optical element 2 is different from that of Embodiment 1. The other structure is the same as Embodiment 1, and common constituent elements are denoted with the same reference numerals or symbols.

In the beginning, the optical path and the optical action in Embodiment 3 will be briefly explained. Light (illumination light) from the light source 5 is transmitted through surfaces 31 and 32 of a third optical element 3 which is an optical system for the illumination light to be condensed and is further transmitted through surfaces 23 and 22 of the second optical element 2 to illuminate the reflective LCD 4. Light (display light) which is modulated and reflected by the reflective LCD 4 is again incident into the second optical element 2 from the surface 22, is then reflected on the surface 23, is further reflected on the surface 22, and emerges out of the second optical element 2 from the surface 21 to travel toward the first optical element 1.

Next, the display light is incident into the first optical element 1 from the surface 12, is reflected on the surface 11, the surface 13, the surface 11, the surface 13, the surface 11 and the surface 12 in this order, and emerges out of the first optical element 1 from the surface 11 to reach an exit pupil S.

An observer who places an eye E in the vicinity of the exit pupil S can observe an enlarged image of the original image which is formed on the reflective LCD 4 with optical actions which the display light receives with the curve surfaces of the first optical element 1 and the second optical element 2 during tracing the abovedescribed optical path.

Next, the structure of the first optical element 1 and the display optical path in the optical element will be described in detail. The surface 12 of the first optical element 1 is a half-mirror surface coated with a half transmissive reflective film of, for example, a metal or a dielectric body. The surface 12 is a transmissive/reflective surface which functions as an incident surface and a final reflective surface for the display light, that is, which has both actions of transmission and reflection.

The surface 11 is a half-mirror surface which is partially coated, for example, with a half transmissive reflective film and is a reflective surface which is partially coated with a reflective film which has an amount of transmission light of substantially 0. This surface 11 is a surface which reflects the display light incident from the surface 12 to guide the display light to the surface 13, and is also a reflective surface which reflects again the light reflected on the surface 13 back to the surface 13 in an opposite direction. Furthermore, the surface 11 is a reflective surface which reflects again the light that was subjected to the second reflection on the surface 13 back to the surface 12, and is also an emergent surface which allows the display light reflected on the surface 12 to emerge from the first optical element 1. Consequently, the surface 11 is a surface which has both actions of a transmission and three reflections.

The surface 13 is a reflective surface provided with a coating of a metal film formed of aluminum or silver, or a dielectric body. The surface 13 is a reflective surface which performs two reflections, that is, a reflection which leads the display light reflected on the surface 11 to the surface 11 again and a reflection which returns again the display light that was subjected to the second reflection on the surface 11 to the reflective surface 11.

The optical path inside the first optical element 1 will be described in detail by using the central principal ray L0. The central principal ray L0 which is incident into the first optical element 1 from the surface 12 is directed to the surface 11 so that the progress direction thereof in the Y-axis projection becomes positive, and is reflected on the surface 11 to be guided to the surface 13 while keeping the state in which the progress direction of the Y-axis projection is positive. On the surface 13, the central principal ray L0 is reflected again toward the surface 11. The central principal ray L0 which is reflected on the surface 13 is incident on the surface 11 substantially perpendicularly with respect to the surface 11. Here, the central principal ray L0 is reflected substantially toward an opposite direction with respect to the progress direction from the surface 13, and the central principal ray L0 travels to the vicinity of the first reflection position (hit point) on the surface 13.

The light which is directed toward the surface 13 from the surface 11 is reflected on the surface 13 to be directed substantially in a direction opposite to the optical path which was traced from the first reflection on the surface 11 to the first reflection on the surface 13, namely toward the surface 11 so that the progress direction of the Y-axis projection becomes negative. That is, the central principal ray L0 is reflected substantially toward the opposite side of the previous reflection with respect to the normal on the hit point of the central principal ray L0 on the surface 13. Then, the central principal ray L0 which is reflected on the surface 13 reaches the vicinity of the first reflection point (hit point) on the surface 11.

In Embodiment 3, the progress direction of the central principal ray L0 is directed toward the opposite direction by reflecting the display light such that an angle θ formed by the incident light and the reflected light in the second reflection on the surface 11 is set to a value smaller than the predetermined angle. Therefore, the central principal ray L0 is incident on again the vicinity of the first reflection position on the surface 11 via the surface 13. As a consequence, the optical path of the surface 11→the surface 13→the surface 11→the surface 13→the surface 11 can be substantially overlapped.

The central principal ray L0 which was subjected to the third reflection on the surface 11 travels again toward the surface 12 while keeping the state in which the progress direction in the Y-axis projection is negative. That is, the central principal ray L0 which was subjected to reflected the third reflection on the surface 11 is reflected substantially toward the opposite side with respect to the normal on the first hit point of the central principal ray L0 on the surface 11, thereby reaching the vicinity of the incident position of the central principal ray L0 toward the first optical element 1 on the surface 12.

In this manner, in Embodiment 3, a to-and-fro optical path of the surface 12→the surface 11→the surface 13→the surface 11→the surface 12 is formed which comprises a forward path of the surface 12→the surface 11→the surface 13→the surface 11 and a return path of the surface 11→the surface 13→the surface 11→the surface 12. Thereby, the optical path therebetween is substantially overlapped.

The central principal ray L0 which is directed from the surface 11 toward the surface 12 is further reflected on the surface 12, travels toward the surface 11, is then transmitted through the surface 11 to emerge from the first optical element, and travels toward the pupil S.

In the aforementioned structure, the light reflected on the surface 11 and the surface 13 (decentered reflective surfaces) is again reflected in an opposite direction toward the surface 11. The second reflection on the surface 11 is referred to as a returning reflection and the surface 11 is referred to as a returning reflective surface. In Embodiment 3, the to-and-fro optical path which is substantially overlapped in the first optical system is formed by arranging the returning reflective surface in the first optical element 1, which is the surface 11 having roles of the returning reflection, two decentered reflections and a transmission. As a result, the optical system can be reduced in size with respect to the optical path length.

Furthermore, the optical path of the surface 12→the surface 11→the surface 13→the surface 11 is folded in the aforementioned forward path with the two surfaces 11 and 13 which serve as reflective surfaces decentered with respect to the central principal ray L0, and the optical path of the surface 11→the surface 13→the surface 11→the surface 12→the surface 11 is folded in the aforementioned return path with the three surfaces 11, 12 and 13 which serve as reflective surfaces decentered with respect to the central principal ray L0. Therefore, the thickness in the Z-axis direction of the first optical element 1 is suppressed and the first optical element 1 is formed as a thin-type optical element.

Here, in the case where the reflective surface before and after the reflection on the returning reflective surface (the surface 11), for example, the reflection on the surface 13 is noted, the directions of outer products each formed by a vector showing the incident direction to the surface 13 and a vector showing the reflection direction therefrom in the forward path and the return path are substantially opposite to each other.

By using the reflection on the returning reflective surface which is thus characterized, a long optical path can be contained in a narrow space while suppressing the occurrence of distortion as compared with so-called zig-zag reflections performed between two ordinary surfaces facing each other.

Furthermore, in Embodiment 3, there has been explained a case in which the incident light and the reflected light (central principal ray L0) on the returning reflective surface (surface 11) exist on the same plane (paper plane of FIG. 11). However, it is not required that the incident light and the reflected light exist on the same plane. That is, a component in a direction perpendicular to the paper plane of the drawing may be given to the light reflected on the returning reflective surface. In this case, for example, when the surface 13 which reflects the central principal ray L0 toward the returning reflective surface and which allows the central principal ray L0 to be incident thereon is noted, the directions of the outer products each formed by the vector showing the incident direction toward the surface 13 and the vector showing the reflection direction therefrom in the forward path and the return path form an obtuse angle. Furthermore, the structure of the optical path can be characterized by the fact that an inner product formed between the abovedescribed outer products becomes negative.

Incidentally, a similar relation is established in the first reflection and the third reflection on the surface 11.

Furthermore, a component in a direction perpendicular to the paper plane of FIG. 11 may be given to the light which is reflected on the other reflective surface in addition to the returning reflective surface.

By doing so, each of the reflective surfaces can have a decentration in a direction perpendicular to the paper plane in FIG. 11 with respect to the central principal ray L0, so that the flexibility of the optical design can be increased.

Next, there will be described a preferable condition for performing the returning reflection (second reflection) with the surface 11.

It is preferable that the range of the angle θ formed with the incidence and reflection of the central principal ray L0 with respect to the surface 11 which is the returning reflective surface is set to $$|\theta| < 45°. \tag{1}$$

If the angle θ is exceeds the upper limit of the condition, the arrangement of each surface is extremely limited in order to form a to-and-fro optical path with the returning reflection, which means that such angle is not preferable. On the other hand, when the structure is provided so as to satisfy the aforementioned conditional expression (1), a to-and-fro optical path is formed with the returning reflection irrespective of the arrangement and the structure of the other surfaces, it becomes relatively easy to reduce the size of the optical system with respect to the optical path length.

Further preferably, the range of e may be set to $$|\theta| < 30°. \tag{2}$$

If the angle θ satisfies the condition, the overlapping degree of the areas which are used in the reflection and transmission on the surface 12, the two reflections on the surface 11 except for the returning reflection and the two reflections on the surface 13 is heightened. Therefore, the optical system can be largely reduced in size.

Furthermore, in Embodiment 3, it is necessary that at least one of the surfaces 11, 12 and 13 of the first optical element 1 is formed as a curve surface for providing an optical power. As a consequence, the surface can contribute to an image-formation action at the time of guiding an enlarged image of the original image formed on the reflective LCD 4 to the pupil S. Preferably, all the surfaces 11, 12 and 13 have optical powers. As a consequence, the surface which does not contribute to the image formation can be eliminated, so that an attempt can be made to decrease the number of optical surfaces to be used and to reduce the cost while keeping the flexibility of the aberration correction on a high level.

Furthermore, it is required that at least two reflections except for the returning reflection on the surface 11 and the reflections on the surfaces 12 and 13 become reflections decentered with respect to the central principal ray L0. Therefore, each of the surfaces becomes a decentered reflective surface for these reflections. Decentering aberration is occurred when optical powers are given to these decentered reflective surfaces. However, in order to correct the decentration aberrations, it is required to form the surfaces in a rotationally asymmetric shape instead of an ordinary rotationally symmetric surface shape. In Embodiment 3, since the decentration is relatively large at the time of the reflection on the surface 12 and the surface 12 has a strong optical power with respect to the surface 11, the occurrence of the decentration aberration on the surface 12 becomes remarkable. Consequently, it is preferable to correct the decentration aberration which is occurred on the surface 12 by forming the surface 12 in a rotationally asymmetric surface.

Further preferably, all the surfaces 11, 12 and 13 of the first optical element 1 are formed as rotationally asymmetric surfaces, so that the aberration correction performance is increased and a high optical performance can be obtained.

Furthermore, in Embodiment 3, it has been explained that the surface 11 of the first optical element 1 is a half-mirror surface on which a half transmissive reflective film of metal or a dielectric body is formed. The reflection on the surface 11 may, however, be an internal total reflection. In this case, it may be constituted such that, in the first and the third reflections except for the returning reflection on the surface 11, the central principal ray L0 is allowed to be incident on the surface 11 at an angle which exceeds a critical angle of a boundary surface (surface 11) between the medium of the first optical element 1 and the outside medium (air). As a consequence, the internal total reflection is occurred. Furthermore, the central principal ray L0 is transmitted through the surface 11 which is the final surface in the optical path by setting an incident angle to an angle smaller than the critical angle. When the structure is satisfied in all the effective luminous flux, it becomes unnecessary to provide a half transmissive film except for the reflective film in the returning reflection area in the surface 11. Consequently, the reduction of cost can be attained and the loss of the light amount can be extremely reduced on the surface 11, so that the usability of light is largely improved.

Furthermore, it may be constituted such that the reflected luminous flux is subjected to an internal total reflection in a shared area with the transmitting luminous flux and the reflecting luminous flux on the surface 11. In this case, it becomes necessary to widen the ordinary reflective film (the amount of transmission light becomes substantially 0) of a metal or a dielectric body in the returning reflection area in the surface 11 and to provide a reflective film in the whole area except for the transmission area in the surface 11. However, as compared with the case in which all the luminous flux in the first and the third reflections luminous flux are subjected to the internal total reflection, the usability of light is virtually not lowered. Furthermore, the incident angle condition for rays which is a restraint condition is removed for part of the luminous flux, so that the flexibility in the design is increased, and an attempt can be more easily made to increase the optical performance. In the case where the reflections with the reflective film and the internal total reflection are both performed in this manner, it is preferable to use a gradation reflective film whose reflectance becomes lower as the position comes close to the internal total reflection area from the reflection area with the reflective film, since the boundary due to a change in the reflectance between the reflection area with the reflective film and the internal total reflection area becomes obscure at the time of observation.

Next, the second optical element 2 will be explained in detail. In Embodiment 3, the second optical element 2 has a surface 23 which serves as an incident surface for the illumination light and a reflective surface for the display light, a surface 22 which serves as an emergent surface for the illumination light, as well as an incident surface and a reflective surface for the display light, and a surface 21 which serves as an emergent surface for the display light. The surface 22 and the surface 23 are constituted as a half-mirror surface by forming a half transmissive film of, for example, a metal or a dielectric body.

A display optical path will be explained by using the central principal ray L0. The central principal ray L0 which is emitted from the center of the effective display area on the display surface of the reflective LCD 4 is incident into the second optical element 2 from the surface 22, and is reflected on the surface 23 which is a reflective surface decentered with respect to the central principal ray L0. The central principal ray L0 reflected on the surface 23 is then reflected on the surface 22 decentered with respect to the central principal ray L0, and emerges out of the second optical element 2 from the surface 21 to be guided to an incident position of the central principal ray L0 of the first optical element 1.

In Embodiment 3, it is required that the second optical element 2 also has a curve surface decentered with respect to the central principal ray L0. Consequently, it is possible that the second optical element 2 is a small-size optical element while effectively using the second optical element 2 for the image formation.

In the second optical element 2 according to Embodiment 3, the surfaces 22 and 23 are reflective surfaces decentered with respect to the central principal ray L0. Since the luminous flux is folded by using the two decentered reflective surfaces in this manner, it is possible to form the second optical element 2 in a thin configuration. Furthermore, it becomes possible to reduce the size of the second optical element 2 and to reduce the size of the whole display optical system because the flexibilities in the direction of guiding the effective luminous flux and in the surface arrangement are heightened. Naturally, the structure may be such that the surface 21 is decentered with respect to the central principal ray L0 to further heightened the arrangement flexibility of the surfaces.

However, as has been described above, it is preferable to suppress the occurrence of decentered aberration to heighten the optical performance by forming at least one of the decentered curve surfaces with a rotationally asymmetric shape because the decentered aberration is occurred when the decentered curve surface is used. Further preferably, when all the surfaces of the second optical element 2 are formed as rotationally asymmetric surfaces, it becomes possible to correct the decentration aberration in the whole optical system for the display light including the residual decentration aberration occurred on the decentered curve surface of the first optical element 1. w As a consequence, a display optical system having a very high optical performance can be provided.

Furthermore, at the time of the decentered reflection on the surface 22, the display effective luminous flux may be subjected to an internal total reflection by setting the incident angle of each of rays for forming the display effective luminous flux on the surface 22 to an angle exceeding the critical angle condition of a boundary surface (surface 22) between the medium of the second optical element 2 and the outside medium (air). When the reflection is formed as an internal total reflection, it is not required to provide a half transmissive reflective film on the surface 22, so that the cost can be decreased and the loss of the light amount on the surface 22 can be largely decreased. Therefore, the usability of light is largely increased.

Incidentally, it is preferable that the optical system for the display light which is constituted of the first optical element 1 and the second optical element 2 is a once-image-forming optical system, that is an optical system which forms an intermediate image of the original image formed on the reflective LCD 4 once inside the system, enlarges the intermediate image and guides it to the pupil S. When the optical system is constituted in this manner, the flexibility of the image formation magnification powers of the first and the second optical elements 1 and 2 as a relay optical system is increased, and the restraint condition in the position of the reflective LCD 4 with respect to the first and the second optical element 1 and 2 as an eyepiece optical system can be eliminated. As a consequence, it becomes possible to widen the angle of view with respect to the size of the reflective LCD 4.

Particularly preferably, when the intermediate image is formed in the returning optical path in the first optical element 1, a balance is favorable between the number of optical surfaces which serves as a relay optical system and the number of optical surfaces which serves as an eyepiece optical system for guiding the intermediate image to the observer. As a result, the aberration correction can be easily performed.

Next, the illumination optical path in the second optical element 2 will be explained. A part of light emitting from the light source 5 and transmitted through the third optical element 3 is incident into the second optical element 2 from the surface 23 which is a half-mirror surface, and the light emerged out of the second optical element 2 from the surface 22 which is a half-mirror surface illuminates the reflective LCD 4.

The surface 22 and 23 which are used as optical systems for the illumination light and the display light are preferably constituted to guide the illumination light such that the portion where is used as an optical system for the illumination light has a positive optical power in total. When the optical system is constituted in this manner, the optical power of the third optical element 3 which is used only as the optical system for the illumination light can be weakened, so that the third optical element 3 can be relatively small in size. Furthermore, as has been described in the explanation in the display optical path, when it becomes unnecessary to provide a half transmissive reflective film on the surface 22 by allowing the luminous flux to be incident thereon at an angle not more than the critical angle at the time of transmission through the surface 22 and allowing the light to be incident thereon at an angle not less than the critical angle at the time of reflection on the surface 22, the loss of light on the surface 22 can be largely reduced and the usability of light can be improved.

Since the third optical element 3 is the same as Embodiment 1, so that detailed description thereof will be omitted.

In Embodiment 3 which has been described above, as compared with Embodiment 1, since the overlapping degree of the optical path is heightened by forming a long to-and-fro optical path inside the first optical element 1, the size of the display optical system with respect to the optical path length can be further reduced. Furthermore, since the optical path is folded in the second optical element 2 by using a plurality of decentered reflective surfaces, the second optical element 2 can be formed as a thin and small-sized optical element with respect to the optical path length.

Furthermore, the length of the optical path can be taken in a long length with respect to the size of the optical system, so that the occurrence of aberrations can be suppressed by weakening the optical power of each surface and the optical performance can be heightened.

Consequently, in Embodiment 3, as compared with Embodiment 1, a display optical system can be realized which is thin and small in size and has a high optical performance. Finally, the size of the image display apparatus can be reduced and the quality of displayed images can be improved.

(Embodiment 4)

Figure 5:
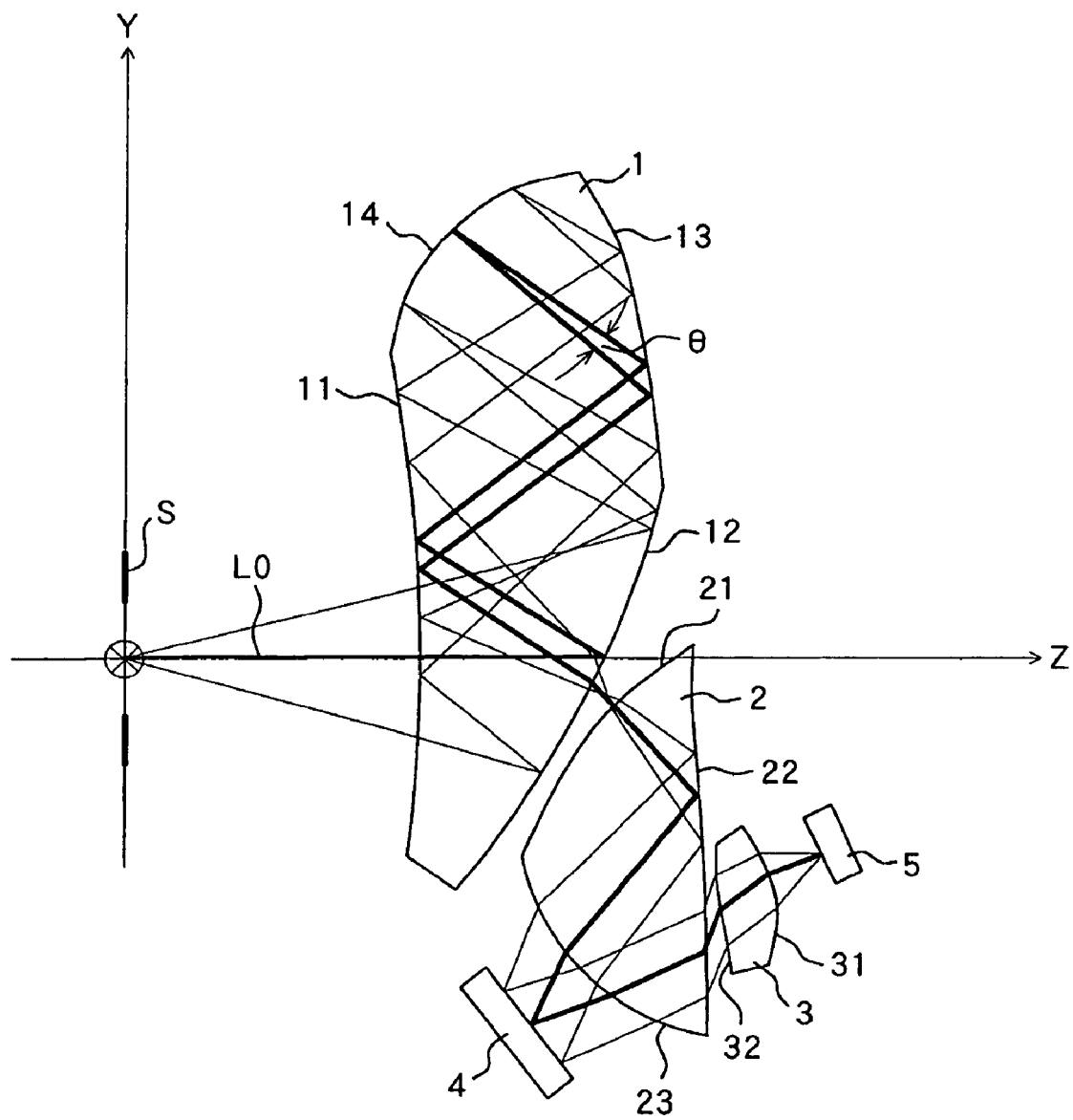
FIG. 5 is a optical path view of the display optical system according to Embodiment 4 of the present invention.

FIG. 5 is an optical path view of a display optical system according to Embodiment 4 of the present invention. In Embodiment 4, a first optical element 1 is formed as an optical element having four surfaces 11, 12, 13 and 14. The optical paths in the first and the second optical element 1 and 2 are changed from Embodiment 1, and furthermore the illumination light optical path in the second optical element 2 is changed from Embodiment 1. The other structure is the same as Embodiment 1, and common constituent elements are denoted by the same reference numerals or symbols.

First, the optical path and the optical action in the display optical system according to Embodiment 4 will be briefly explained. Light (illumination light) from the light source 5 is transmitted through surfaces 31 and 32 of a third optical element 3 which is an optical system for the illumination light to be condensed, and is further transmitted through surfaces 22 and 23 of the second optical element 2 to illuminate the reflective LCD 4.

Light (display light) modulated and reflected by the reflective LCD 4 is again incident into the second optical element 2 from the surface 23, is then reflected on the surface 22 and emerges out of the second optical element 2 from a surface 21 to travel toward the first optical element 1.

Next, the display light is incident into the first optical element 1 from the surface 12 and is reflected on the surface 11, the surface 13, the surface 14, the surface 13, the surface 11 and the surface 12 in this order. The display light then emerges out of the first optical element 1 from the surface 11 to reach an exit pupil S. The observer who places an eye E in the vicinity of the exit pupil S can observe an enlarged image of the original image formed on the reflective LCD 4 by optical actions which the display light receives from the curve surfaces of the first optical element 1 and the second optical element 2 during tracing the optical path.

Next, the structure of the first optical element 1 and the display optical path in the optical element 1 will be described in detail. The surface 12 of the first optical element 1 is a half-mirror surface coated with a half-transmissive reflective film of, for example, a metal or a dielectric body. The surface 12 is a transmissive/reflective surface which functions as an incident surface of the display light and a final reflective surface for the display light.

The surface 11 is a half-mirror surface which is coated, for example, with a half-transmissive film, and the surface 11 is a surface for reflecting the display light which is incident from the surface 12 to guide the display light to the surface 13. Furthermore, the surface 11 is a reflective surface which performs the second reflection for the display light on the surface 13 back to the surface 12 and is also an emergent surface which allows the display light to emerge from the first optical element 1. Consequently, the surface 11 is a surface which serves both for a transmission and for two reflections.

The surface 13 is a reflective surface which is provided with a coating of a metal film formed of aluminum or silver, or a dielectric body, and which has a transmission light amount of substantially 0. The surface 13 is a reflective surface which performs two reflections, that is, a reflection which guides the display light reflected on the reflective surface 11 to the surface 14 and a reflection which again reflects the light reflected on the surface 14 back to the surface 11.

The surface 14 is a reflective surface which is provided with a coating of a metal film or a dielectric body film and which has a transmission light amount of substantially 0. The surface 14 is a reflective surface which again reflects the display light reflected on the surface 13 back to the surface 13.

Next, the optical path inside the first optical element 1 will be described in detail by using the central principal ray L0. The central principal ray L0 which is incident into the first optical element 1 from the surface 12 is directed to the surface 11 so that the progress direction in the Y-axis projection thereof becomes positive, and the central principal ray L0 is then reflected on the surface 11 to be guided to the surface 13 while keeping the state in which the progress direction of the Y-axis projection is positive.

On the surface 13, the central principal ray L0 is reflected so as to travel toward the surface 14 while keeping the state in which the progress direction of the Y-axis projection is positive. The central principal ray L0 which is reflected on the surface 13 is incident on the surface 14 substantially perpendicularly with respect to the surface 14 and reflected thereon, travels in a substantially opposite direction with respect to the progress direction from the surface 13, and travels to the vicinity of the first reflection position (hit point) on the surface 13. The central principal ray L0 which is directed toward the surface 13 is reflected on the surface 13 to be directed in a direction substantially opposite to the optical path direction at the time from the first reflection on the surface 11 to the first reflection on the surface 13, toward the surface 11 so that the progress direction of Y-axis projection becomes negative. That is, the central principal ray L0 is reflected substantially toward the opposite side of the previous reflection with respect to the normal on the hit point of the central principal ray L0 on the surface 13. Then, the central principal ray L0 from the surface 13 reaches the vicinity of the first reflection point (hit point) on the surface 11.

In Embodiment 4, the progress direction of the central principal ray L0 is directed toward the opposite direction by reflecting the ray L0 such that an angle θ formed by the incident light and the reflected light in the second reflection of the central principal ray L0 on the surface 11 becomes an angle smaller than the predetermined angle. Therefore, that the ray L0 is incident on again the vicinity of the first reflection position on the surface 11 via the surface 13. As a consequence, the optical path of the surface 11→the surface 13→the surface 14→the surface 13→the surface 11 can be substantially overlapped.

The central principal ray L0 which was subjected to the second reflection on the surface 11 travels again toward the surface 12 while keeping the state in which the progress direction in the Y-axis projection is negative. That is, the central principal ray L0 is reflected substantially toward the opposite side with respect to the normal on the first hit point of the central principal ray L0 on the surface 11, thereby reaching the vicinity of the incident position of the central principal ray L0 on the surface 12 of the first optical element.

In this manner, in Embodiment 4, a to-and-fro optical path of the surface 12→the surface 11→the surface 13→the surface 14→the surface 13→the surface 11→the surface 12 is formed which comprises a forward path of the surface 12→the surface 11→the surface 13→the surface 14 and a return path of the surface 14→the surface 13→the surface 11→the surface 12. As consequence, the optical path therebetween is substantially overlapped.

The central principal ray L0 which is directed from the surface 11 toward the surface 12 is further reflected on the surface 12, is transmitted through the surface 11 to emerge from of the first optical element 1 and travels toward the pupil S.

In the aforementioned structure, the light reflected on the surface 11 and the surface 13 (decentered reflective surfaces) is again reflected on the surface 14 in an opposite direction toward the surfaces 13 and 11. The reflection on the surface 14 is referred to as a returning reflection, and the surface 14 is referred to as the returning reflective surface. It becomes possible to form an optical system in a compact size with respect to the optical path length by forming the to-and-fro optical path which is substantially overlapped in the first optical element 1 by arranging the returning reflective surface in the first optical element 1 to subject the display light to the returning reflection.

Furthermore, the optical path of the surface 12→the surface 11→the surface 13→the surface 14 is folded in the aforementioned forward path with two surfaces 11 and 13 which act as reflective surfaces decentered with respect to the central principal ray L0 and the optical path of the surface 14→the surface 13→the surface 11→the surface 12→the surface 11 is folded in the aforementioned return path with three surfaces 11, 12 and 13 which act as reflective surfaces decentered with respect to the central principal ray L0. As a result, a thickness in the Z-axis direction of the first optical element 1 is suppressed and the first optical element is formed as a thin type optical element.

Here, in the case where the reflection on the reflective surface before and after the reflection on the returning reflective surface (surface 14), for example, the reflection on the surface 13 is noted, the directions of outer products each formed by a vector showing the incident direction to the surface 13 and a vector showing the reflective direction therefrom in the forward path the return path are substantially opposite to each other.

By using the reflection on the returning reflective surface which is thus characterized, a long optical path can be contained in a narrow space while suppressing the occurrence of distortion in comparison with so-called zig-zag reflections between two ordinary surfaces facing each other.

Furthermore, in Embodiment 4, there has been explained a case in which the incident light and the reflected light of the central principal ray L0 on the returning reflective surface (surface 14) and on the other reflective surfaces exist on the same plane (paper plane of the drawing). However, it is not required that all the incident light and the reflected light exist on the same plane. That is, a component in a direction perpendicular to the paper plane of the drawing is given to the light reflected on the returning reflective surface. In this case, for example, when the surface 13 which reflects the central principal ray L0 toward the returning reflective surface (surface 14) and which allows the central principal ray L0 to be incident thereon is noted, the directions of outer products each formed by the vector showing the incident direction toward the surface 13 and the vector showing the reflection direction therefrom in the forward path and the return path form an obtuse angle. Furthermore, the structure of the optical path can be characterized by the fact that the an inner product formed between the above-described outer products becomes negative.

Furthermore, a component in a direction perpendicular to the paper plane of FIG. 14 may be given to the light which is reflected on the other reflective surface in addition to the returning reflective surface.

By doing so, each of the reflective surfaces can have a decentration in a direction perpendicular to the paper plane in FIG. 14 with respect to the central principal ray L0. As a consequence, the flexibility of the optical design can be increased Next, a preferable condition for forming the returning reflection with the surface 14 will be described. It is preferable that the range of an angle θ formed with the incidence and reflection of the central principal ray L0 with respect to the surface 14 which is the returning reflective surface is set to $$|\theta|<45°. \tag{1}$$

If the angle θ exceeds the upper limit of the condition, the arrangement of each surface is extremely limited in order to form a to-and-fro optical path with the returning reflection, which means that such angle is not preferable. When structure is provided so as to satisfy the aforementioned conditional expression (1), the to-and-fro optical path is formed with the returning reflection irrespective of the arrangement and structure of other surfaces, it becomes relatively easy to reduce the size of the optical system with respect to the optical path length.

Further preferably, the range of θ may be set to $$|\theta|<30°. \tag{2}$$

If the angle θ satisfies the condition, the overlapping degree of the areas which are used in the reflection and transmission on the surface 12, the two reflections on the surface 11 except for the returning reflection and the reflection on the surface 13 is heightened, so that the optical system can be largely reduced in size.

Furthermore, in Embodiment 4, it is necessary that at least one surface of the surfaces 11, 12, 13 and 14 on the first optical element 1 is formed as a curve surface to have an optical power. Thereby, the surface can contribute to an image formation action at the time of enlarging an image of the original image formed on the reflective LCD 4 and guiding the image to the pupil S.

Furthermore, preferably all the surfaces 11, 12, 13 and 14 have optical powers. As a consequence, the surface which does not contribute to the image formation can be eliminated, so that the number of optical surface to be used and the cost can be reduced while keeping the flexibility of the aberration correction on a high level.

Furthermore, it is required that at least the two reflections on the surface 11, the reflection on the surface 12 and the two reflections on the surface 13 become reflections decentered with respect to the central principal ray L0. Therefore, each of the surfaces is formed as a decentered reflective surface with respect to these reflections. Since decentration aberration occurs when an optical power is given to the decentered reflective surface, in order to correct the decentration aberration, it is required to form the surface in a rotationally asymmetric shape instead of an ordinary rotationally symmetric shape. In Embodiment 4, it is preferable to correct the decentration aberration which occurs on the surface by forming at least one surface of these decentered reflective curve surfaces in a rotationally asymmetric shape. Furthermore, the aberration correction performance can be increased and a high optical performance can be attained by forming each of the decentered reflective surfaces 11, 12 and 13 on the first optical element 1 in a rotationally asymmetric shape. When the surface 14 is further formed in a rotationally asymmetric shape, the aberration correction performance can be further improved.

Furthermore, in Embodiment 4, there has been explained that the surface 11 of the first optical element 1 is a half-mirror surface on which a half transmissive film of a metal or a dielectric body is formed. The reflection of the luminous flux on the surface 11 may be an internal total reflection. In this case, in the two reflections on the surface 11, it may be constituted such that the internal total reflection is performed by setting the incident angle of the luminous flux with respect to the surface 11 to an angle exceeding a critical angle of a boundary surface (surface 11) between the medium of the first optical element 1 and the outside medium (air) and a transmission is performed by setting the incident angle on the final surface 11 in the optical path to an angle smaller than the critical angle. When this is satisfied in all the effective luminous flux, it becomes unnecessary to provide a half-transmissive reflective film on the surface 11, so that the cost can be reduced. Furthermore, since the loss of the light amount on the surface 11 is extremely reduced, the usability of light can be largely improved.

Furthermore, it may be constituted so that only in the shared area for the transmission luminous flux and the reflected luminous flux in the surface 11, the reflected luminous flux is subjected to an internal total reflection. In this case, it becomes necessary to provide an ordinary reflective film (whose amount of transmitting light becomes substantially 0) of a metal or a dielectric body on an area except for the transmission area in the surface 11. However, in this case, as compared with the case in which all the luminous flux is subjected to an internal total reflection in two reflections, the usability of light is not virtually lowered. Besides, the condition of the incident angle of rays which is a restraint condition is removed in a part of the luminous flux, so that the flexibility in the design is increased, and the optical performance can be easily increased.

In the case where reflections with the reflective film and the internal total reflection are performed, using a gradational film whose reflectance becomes lower as the position comes close to the internal total reflection area from the reflection area with the reflective film makes obscure a boundary due to a change in reflectance between the reflection area with the reflective film and the internal total reflection area at the time of observation. This means that the use of the gradation film is preferable.

Furthermore, the second optical element 2 will be described in detail. The second optical element 2 according to Embodiment 4 has the surface 23 which serves as an emergent surface for the illumination light and an incident surface for the display light, the surface 22 which serves as incident surface for the illumination light and a reflective surface for the display light, and a surface 21 which serves as an emergent surface for the display light.

The surface 22 is a surface on which a reflective film, for example, of a metal or a dielectric body is partially formed and which has a transmission light amount of substantially 0. When the display optical path is explained by using the central principal ray L0, the central principal ray L0 which is emerged from the center of the effective display area on the display surface of the reflective LCD 4 is incident into the second optical element 2 from the surface 23, is then reflected at the reflective film portion on the surface 22 and emerges out of the second optical element 2 from the surface 21 to be guided to an incident position of the central principal ray L0 of the first optical element 1.

In Embodiment 4, it is required that the second optical path 2 has a curve surface which is decentered with respect to the central principal ray L0. Thereby, it is possible to form a small-size optical system while using the second optical element 2 for an image formation action.

In the second optical element 2 according to Embodiment 4, the surface 22 is a reflective surface which is decentered with respect to the central principal ray L0. Needless to say, it may be constituted such that the surfaces 21 and 23 are decentered with respect to the central principal ray L0 to further heighten the flexibility of the surface arrangement.

However, as has been described above, since the decentration aberration occurs when the decentered curve surface is used, preferably the occurrence of the decentration aberration is suppressed by forming at least one of the decentered curve surfaces in a rotationally asymmetric shape to improve the optical performance.

Further preferably, when all the surfaces of the second optical element 2 are formed in a rotationally asymmetric shape, it becomes possible to correct the decentration aberration in the whole optical system for the display light including the residual decentration aberration occurred on the decentered curve surface of the first optical element 1. As a consequence, the display optical system having an extremely high optical performance can be realized.

Furthermore, it may be constituted such that each ray of light constituting the display luminous flux is incident on the surface 22 which is decentered with respect to the central principal ray L0 at an angle exceeding the critical angle to be subjected to an internal total reflection. When such internal total reflection is performed, it becomes unnecessary to provide a reflective film partially on the surface 22, so that the cost can be reduced.

Incidentally, it is preferable that the optical system for the display light which comprises the first optical element 1 and the second optical element 2 is formed as a once-image-forming optical system which is constituted such that the optical system for the display light forms an intermediate image of the original image formed on the reflective LCD 4 once inside the system and enlarges the intermediate image to guide the image to the pupil S.

As a consequence, the flexibility of the image formation magnification powers of the first and second optical elements 1 and 2 as a relay optical system is increased and the restraint condition of the position of the reflective LCD 4 with respect to the first and second optical elements 1 and 2 as an eyepiece optical system is settled. Therefore, the angle of view can be widened with respect to the reflective LCD 4.

Particularly preferably when the intermediate image is formed in the returning optical path inside the first optical element 1, a balance is favorable between the number of optical surfaces which serve as the relay optical system and the number of optical surfaces which serve as the eyepiece optical system for guiding the intermediate image to the observer. Therefore, the aberration correction can be easily performed.

Next, the illumination optical path in the second optical element 2 will be explained. Part of light which is emitted from the light source 5 and transmitted through the third optical element 3 is incident into the second optical element 2 from the non-reflective film portion which is different from a reflection position of the display light in the surface 22. The illumination light which is incident on the second optical element 2 emerges out of the second optical system 2 from the surface 23 to illuminate the reflective LCD 4.

Preferably, the surfaces 22 and 23 which are used not only in the optical system for the illumination light but also in the optical system for the display light are constituted such that the portions thereof where are used as the optical system for the illumination light have a positive optical power in total. As a consequence, the optical power of the third optical element 3 used only in the optical system for the illumination light can be weakened, so that the third optical element 3 can be relatively small in size.

Furthermore, in Embodiment 4, since the reflection area for the display light on the surface 22 and the incidence area for the illumination light on the surface 22 are set to be different from each other, it is easy to constitute the system such that only the reflecting luminous flux in the display optical path satisfies the internal total reflection condition. It is thereby also possible to eliminate the reflective film.

Since the third optical element 3 is the same as Embodiment 1, detailed explanation thereof will be omitted.

In Embodiment 4 which has been explained above, a long to-and-fro optical path is formed by forming four surfaces on the first optical element 1 to heighten the overlapping degree of the optical path. Consequently, as compared with Embodiment 1, the size of the optical system with respect to the optical path length can be further reduced. Furthermore, since four surfaces are formed on the first optical element 1, the number of surfaces to be used for the aberration correction is increased as compared with Embodiment 3, so that a high optical performance can be realized with ease.

Furthermore, since the reflection area for the display light on the surface 22 and the incidence area for the illumination light are set to be different from each other, the usability of light can be increased without increasing the number of surfaces on the second optical element 2.

Then, in each of Embodiments described above, both the display light optical path and the illumination light optical path are formed by using the second optical element (second optical system)., that is, the second optical element is used both as the optical element for the display light and for the illumination light. As a consequence, the size of the whole display optical system can be reduced. Furthermore, a display optical system can be realized which is small, thin and appropriate for a wide angle of view with the effect of the reduction of the size of the optical system with respect to the optical path length or the like, by forming generally a to-and-fro optical path in the first optical element 1 (the first optical system). Furthermore, a display optical system can be realized in which the structure and combination of the first optical element and the second optical element are rich in variation and the combination can be easily changed in accordance with the specification.

Furthermore, in each of the aforementioned Embodiment, it is possible to realize a display optical system which has a high optical performance with a high decentration aberration correction capability by providing a plurality of rotationally asymmetric surfaces in the optical system for the display light.

Furthermore, a display optical system having a wide angle of view can be realized by constituting the system such that an intermediate image of the original image formed in the reflective LCD is formed in the optical system for the display light. Thereby, the flexibility in setting of the angle of view with respect to the size of the formed image can be increased.

Furthermore, it is possible to realize a display optical system which improves the usability of light to enable a bright image display by providing a shared area in which a luminous flux to transmit shares with a luminous flux being subjected to an internal total reflection in at least one surface of the first optical element.

Furthermore, an attempt can be made to improve the illumination efficiency and reduce the size of the light source by providing a third optical element (third optical system) which is used only in the optical system for the illumination light. Besides, the illumination light is efficiently condensed by forming a rotationally asymmetric surface on the third optical element, so that a display optical system can be realized which enables the display of a brighter image.

Furthermore, the usability of light can be improved by forming the transmissive surface on the second optical element as an incident surface for the illumination light and an emergent surface for the display light.

Furthermore, the second optical element is constituted as a small element and a small-size display optical system is realized by forming at least one surface on the second optical element as a surface which allows one of the illumination light and the display light to transmit the surface and which allows the other light to be reflected thereon.

Furthermore, a bright image display is realized by performing an internal total reflection on the second optical element, so that it becomes unnecessary to form the reflective film on the second optical element and an inexpensive display optical system can be realized by reducing the cost.

Incidentally, it has been explained that the reflective image forming element is formed simply as a reflective LCD. In actuality, preferably the element is a one polarizing plate type reflective LCD having one polarizing plate immediately before the LCD. Consequently, as compared with a type using two polarizing plates between the illumination light optical path and the display light optical path, no influence is exerted upon the polarization of light even when a certain degree of birefringence and a distribution of the refractive index is generated in a medium of the second optical element 2 having a decentered curve surface. Consequently, the image quality is not deteriorated when using a plastic mold member or the like, so that a flexibility of the medium selection is increased.

Furthermore, an image forming element may be used for forming an original image by driving a small-size mirror piece as a pixel unit such as a DMD (digital micro-mirror device) or the like instead of a reflective LCD.

Furthermore, in the aforementioned Embodiments, there has been explained a case where the first optical element 1 and the second optical element 2 are separately constituted. However, an incident surface for the display light on the second optical element 2 and an emergent surface for the display light on the first optical element 1 are formed in an approximately identical shape and these surfaces can be cemented to each other with a transparent adhesive or the like. Thereby, the first optical element 1 and the second optical element 2 may be integrated to each other. When such two optical elements are cemented to each other, the effect of the cost reduction through the simplification of the assembling and adjustment process can be obtained. Furthermore, the occurrence of chromatic aberration can be suppressed as compared with the case of a separate structure of sandwiching an air layer therebetween. Furthermore, when the first optical element 1 and the second element 2 are formed of the same medium and are cemented with an adhesive having an approximately equal refraction power, the occurrence of the chromatic aberration can be suppressed at the time of the emergence from the second optical element 2 and the incidence on the first optical element 1 of display light.

Furthermore, in each of Embodiments, there has been explained a case in which the first and the second optical system are respectively constituted of prism-shaped optical elements. However, the first and second optical elements may be constituted of a combination of mirrors or lenses.

While preferred embodiments have been described, it is to be understood that modification and variation of the present invention may be made without departing from scope of the following claims.

What is claimed is:

1. A display optical system comprising:
   a light source;
   a reflective image forming element which receives illumination light from the light source and provides display light; and
   an optical system which guides display light from the image forming element to an eye of an observer,
   wherein the optical system includes a first optical system and a second optical system, the first optical system including a first surface which has at least a reflective action and is decentered with respect to a central principal ray, and a second surface which reflects the central principal ray light reflected on the first surface again toward the first surface,
   the first surface reflects the central principal ray which is again incident on the first surface from the second surface substantially toward an opposite side to the previous reflection with respect to a normal on a hit point of the central principal ray on the first surface,
   at least one surface of the second optical system has a curve surface shape which is decentered with respect to the central principal ray,
   the first optical system directs the display light to the eye of the observer,
   the second optical system directs the illumination light to the image forming element and directs the display light to the first optical system, and
   at least one surface of the second optical system transmits one of the illumination light and the display light, and reflects the other.

2. A display optical system comprising:
   a light source;
   a reflective image forming element which receives illumination light from the light source and provides display light; and
   an optical system which guides display light from the image forming element to an eye of an observer,
   wherein the optical system includes a first optical system and a second optical system, the first optical system including a first surface which has at least a reflective action and is decentered with respect to a central principal ray, and a second surface which reflects the central principal ray light reflected on the first surface again toward the first surface,
   the first surface reflects the central principal ray which is again incident on the first surface from the second surface substantially toward an opposite side to the previous reflection with respect to a normal on a hit point of the central principal ray on the first surface,
   at least one surface of the second optical system has a curve surface shape which is decentered with respect to the central principal ray,
   the first optical system directs the display light to the eye of the observer,
   the second optical system directs the illumination light to the image forming element and directs the display light to the first optical system, and the optical system includes a third optical system which has a condensing action on the illumination light which is directed to the second optical system from the light source.

3. The display optical system according to claim 2, wherein the third optical system includes a rotationally asymmetric surface.

4. A display optical system comprising:
a light source;
a reflective image forming element which receives illumination light from the light source and provides display light; and
an optical system which guides display light from the image forming element to an eye of an observer,
wherein the optical system includes a first optical system and a second optical system, the first optical system including a fast surface which has at least a reflective action and is decentered with respect to a central principal ray, and a second surface which reflects the central principal ray light reflected on the first surface again toward the first surface,
the first surface reflects the central principal ray which is again incident on the first surface from the second surface substantially toward an opposite side to the previous reflection with respect to a normal on a hit point of the central principal ray on the first surface,
at least one surface of the second optical system has a curve surface shape which is decentered with respect to the central principal ray,
the first optical system directs the display light to the eye of the observer,
the second optical system directs the illumination light to the image forming element and directs the display light to the first optical system, and
the second optical system includes a transmission surface which transmits the illumination light and the display light, and a transmissive area for the illumination light and a transmissive area for the display light in the transmission surface arc different from each other.

5. A display optical system comprising:
a light source;
a reflective image forming element which receives illumination light from the light source and provides display light; and
an optical system which guides display light from the image forming element to an eye of an observer,
wherein the optical system includes a first optical system and a second optical system, the first optical system having a reflective surface which is decentered with respect to an optical path and reflects the display light a plurality of times, and including a case in which an inner product between outer products each formed by vectors of incident light and reflected light in the respective reflections performed the plurality of times is negative,
at least one surface of the second optical system has a curve surface shape which is decentered with respect to the optical path,
the first optical system directs the display light to the eye of the observer,
the second optical system directs the illumination light to the image forming element and directs the display light to the first optical system, and
at least one surface of the second optical system transmits one of the illumination light and the display light, and reflects the other.

6. A display optical system comprising:
a light source;
a reflective image forming element which receives illumination light from the light source and provides display light; and
an optical system which guides display light from the image forming element to an eye of an observer,
wherein the optical system includes a first optical system and a second optical system, the first optical system having a reflective surface which is decentered with respect to an optical path and reflects the display light a plurality of times, and including a case in which an inner product between outer products each formed by vectors of incident light and reflected light in the respective reflections performed the plurality of times is negative,
at least one surface of the second optical system has a curve surface shape which is decentered with respect to the optical path,
the first optical system directs the display light to the eye of the observer,
the second optical system directs the illumination light to the image forming element and directs the display light to the first optical system, and
the optical system includes a third optical system which has a condensing action on the illumination light which is directed toward the second optical system from the light source.

7. The display optical system according to claim 6, wherein the third optical system includes a rotationally asymmetric surface.

8. A display optical system comprising:
a light source;
a reflective image forming element which receives illumination light from the light source and provides display light; and
an optical system which guides display light from the image forming element to an eye of an observer;
wherein the optical system includes a first optical system and a second optical system, the first optical system having a reflective surface which is decentered with respect to an optical path and reflects the display light plurality of times, and including a case in which an inner product between outer products each formed by vectors of incident light and reflected light in the respective reflections performed the plurality of times is negative,
at least one surface of the second optical system has a curve surface shape which is decentered with respect to the optical path,
the first optical system directs the display light to the eye of the observer,
the second optical system directs the illumination light to the image forming element and directs the display light to the first optical system, and
the second optical system includes a transmissive surface which transmits the illumination light and the display light, and a transmission area for the illumination light and a transmission area for the display light in the transmissive surface are different from each other.

* * * * *